United States Patent [19]

Baker et al.

[11] Patent Number: 4,458,824
[45] Date of Patent: Jul. 10, 1984

[54] FUEL CAP ASSEMBLY

[75] Inventors: Steven F. Baker, Bellevue; Albert D. Johnston, Huron, both of Ohio

[73] Assignee: General Motors Corporation, Detroit, Mich.

[21] Appl. No.: 503,827

[22] Filed: Jun. 13, 1983

[51] Int. Cl.³ .............................................. B65D 41/04
[52] U.S. Cl. .................... 220/203; 220/288; 220/DIG. 33
[58] Field of Search ............... 220/203, 288, 361, 365, 220/85 VR, 85 YS, DIG. 32, DIG. 33

[56] References Cited

U.S. PATENT DOCUMENTS

| | | | |
|---|---|---|---|
| 4,079,855 | 3/1978 | Ayrea | 220/361 X |
| 4,136,795 | 1/1979 | Crute et al. | 220/DIG. 32 X |
| 4,142,648 | 3/1979 | Johnson et al. | 220/203 |
| 4,228,915 | 10/1980 | Hooper | 220/288 |
| 4,252,246 | 2/1981 | Johnson et al. | 220/203 |
| 4,299,102 | 11/1981 | Aro | 220/203 X |

Primary Examiner—Steven M. Pollard
Attorney, Agent, or Firm—Donald F. Scherer

[57] ABSTRACT

A fuel cap assembly has a handgripping cover portion, a threaded closure portion and a ring portion. The ring portion has an inwardly facing lip for axially supporting the closure and a flexible skirt depending from the inwardly facing lip and terminating in an outwardly facing lip. The inwardly facing lip flexes outwardly during assembly of the closure into the ring and the skirt flexes inwardly during assembly of the ring and closure into the cover. An annular groove is formed in the cover at a location aligned with the outwardly facing lip such that the skirt can assume its unflexed position and thereby secure the fuel cap assembly.

3 Claims, 3 Drawing Figures

FUEL CAP ASSEMBLY

This invention relates to fuel cap assemblies and more particularly to fuel cap assemblies being comprised of separate molded components.

Fuel cap assemblies found in the prior art and formed of a plurality of molded plastic components, generally require complex tab and slot designs. These tab and slot structures require the use of intricately molded cavity structures. An example of one such fuel cap is shown in U.S. Pat. No. 4,252,246 issued Jan. 24, 1981 to Johnson et al. Other cap assembly structures having so-called snap together features are known. These caps require the use of molded cavities wherein components of the mold are required to move prior to the removal of the molded product from the cavity.

The present invention teaches a fuel cap assembly structure wherein the individual components which provide the securement for the final assembly, that is, the cover and retaining ring, can be molded in cavities of a simple design. These molded cavities can have substantially straight wall elements. Thus, the forming of the mold cavities can be accomplished by simple machining procedures.

It is an object of this invention to provide an improved fuel cap assembly wherein a handgripping cover and a threaded closure are secured together by a ring member having an inwardly disposed lip supporting the closure, a flexible skirt portion depending from the inwardly disposed lip and a terminating lip portion coacting with an annular groove formed in the cover to prevent removal of the ring therefrom.

It is another object of this invention to provide an improved fuel cap assembly having a cover and a closure secured together by a ring which has formed integrally thereon an inwardly projecting lip portion which is outwardly flexible to permit insertion of the closure into the ring and retention thereby prior to cap assembly and the ring also including a flexible downwardly diverging skirt terminating in a lip portion and wherein the skirt is inwardly flexible during assembly of the ring and closure with the cover and the terminating lip portion thereof being disposed to coact with an annular groove in the cover to maintain the cover, closure and ring in an assembly.

These and other objects and advantages of the present invention will be more apparent from the following specification and drawings in which.

Figure 1:
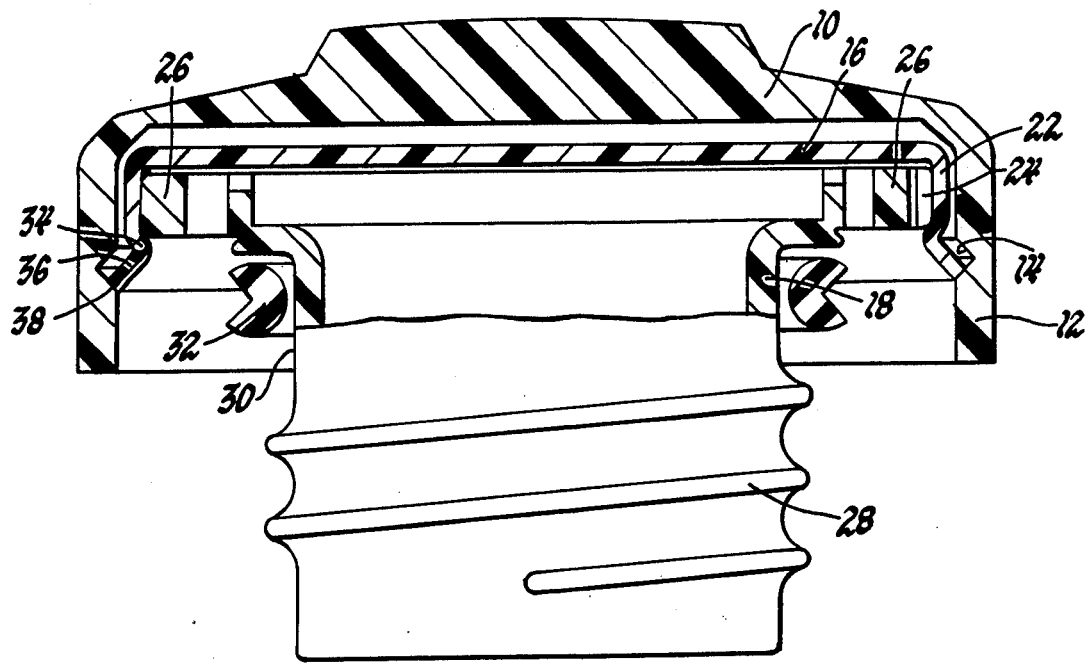
FIG. 1 is a cross-sectional elevational view of a fuel cap incorporating the present invention.

Referring to FIG. 1, there is seen a fuel cap having a handgripping cover portion 10. The cover 10 has a cylindrical wall portion 12, the inner surface of which has formed therein an annular notch or groove 14. Disposed within the cylindrical portion 12 is a ring member 16 and a portion of the threaded closure member 18. The ring 16 has a cylindrical portion 22 having a plurality of cams or ratchet teeth 24 formed on the inner periphery thereof. These ratchet teeth 24 cooperate with a plurality of torque arms 26 formed integrally with the closure 18 in a well-known manner. The torque arms 26 and ratchet teeth 24 cooperate in a well-known manner to provide a limited torque drive connection in one direction and a positive drive in the opposite direction.

The threaded closure 18 has an elongated threaded body portion 28 which is adapted to threadably engage a fuel tank fill tube to provide closure thereof in a well-known manner. The body portion 28 has a cylindrical wall portion 30 on which is disposed a seal ring 32. The seal ring 32 is preferably constructed in accordance with the seal ring shown in U.S. Pat. No. 4,065,026 issued Dec. 27, 1977 to Williams et al. and assigned to the assignee of the present invention.

The ring 16 includes an annular lip portion 34 formed on the lower end of cylindrical portion 22. Extending downwardly from lip 34 and diverging outwardly is a skirt portion 36 which terminates in a lip or flat edge 38. The skirt portion 36 is a frusto-conical shape.

The lip 34 provides axial support in one direction for the torque arms 26 and therefore threaded closure portion 18. Prior to assembly into the cover 10 as shown, the threaded closure portion 18 can be pressed into the ring 16. During the insertion of the closure 18, the lip portion 34 will flex outwardly while the torque arms 26 flex inwardly to permit relative ease of assembly.

After the closure 18 is assembled within the ring 16, the subassembly formed thereby can be pressed into the handgripping cover 10. During this assembly, the skirt portion 36 will flex inwardly while the cylindrical portion of cover 10 may flex outwardly a slight amount. When the ring 16 is pressed into cover 10 to the position shown, the skirt 36 will assume its unflexed position with the terminating lip 38 engaging the surface of groove 14. Attempted removal of the ring 16 from the cover 10 will be prevented by the skirt 36 and groove 14.

Figures 2, 3:
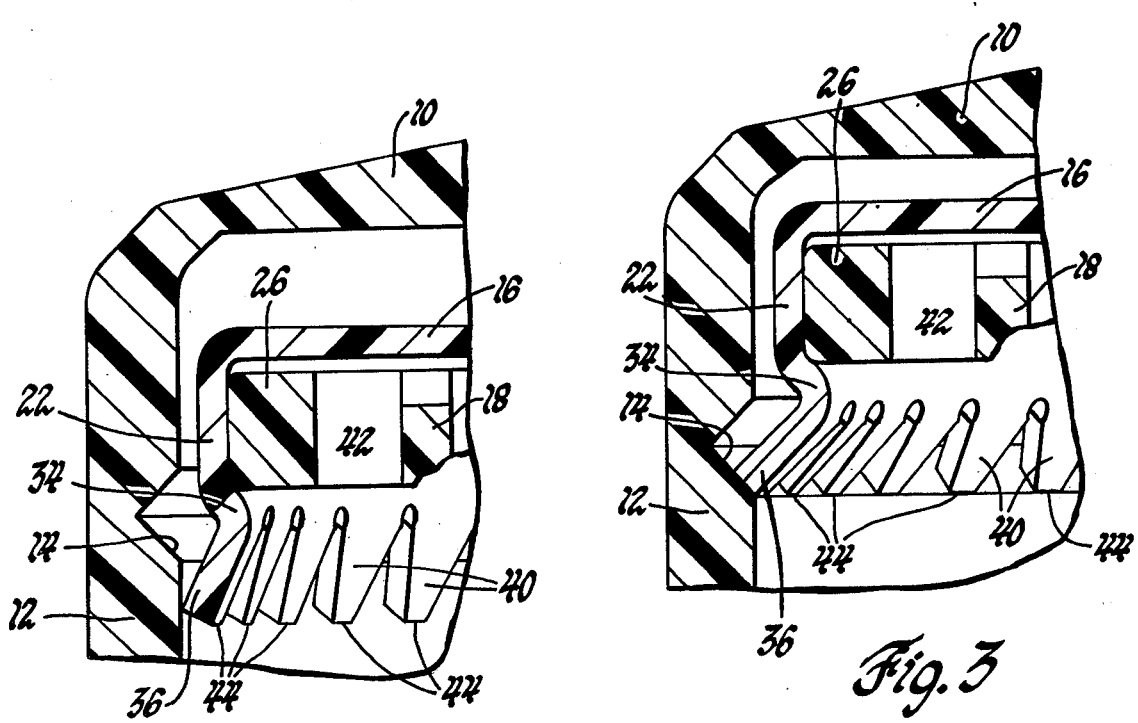
FIG. 2 is a partially assembled enlarged view of the fuel cap showing another embodiment of the invention.
FIG. 3 is a view similar to FIG. 2 showing full assembly of the fuel cap.

The fuel cap embodiment shown in FIGS. 2 and 3 is substantially the same as that shown in FIG. 1 with the exception that the skirt 36 of FIG. 1 is formed with a plurality of triangularly shaped portions 40 which terminate in substantially circular portions 42 adjacent the lip portion 34.

As seen in FIG. 2, the individual triangular portions 40 of skirt 36 will flex inwardly as the ring 16 and threaded closure 18 are assembled with the cover 10. Each of the triangular portions 40 terminates in a lip or flat edge portion 44 which, as shown in FIG. 3, engage the groove 14 formed in the cover 10.

The ring 16 has sufficient frictional connection with the cover 10 so that unitary rotation of these parts will be maintained even when the torque limited drive connection is overcome and the threaded closure portion 18 is stationary. If desired, a more positive drive connection between the cover 10 and ring 16 can be provided in the form of driving spline teeth either disposed in the groove 14, on the cylindrical surfaces 22 and 12, or between the flat horizontal portions of the cover 10 and ring 16.

Those skilled in the art will recognize how these drive connections can be included within the structure shown and it is not considered that the present invention is limited to any one particular drive connection between these components.

The embodiments of the invention in which an exclusive property or privilege is claimed are defined as follows:

1. An improvement in fuel caps having a handgrip cover and a closure portion, said improvement comprising; a ring disposed between the cover and the closure portion and including a radially inwardly projecting lip which is outwardly flexible prior to assembly in the cover portion to permit a portion of the closure to be retained in said ring, and a flexible skirt portion having a terminal radially outwardly projecting lip which is inwardly flexible upon assembly in the cover portion; and annular groove means in said cover portion alignable with the lip of said skirt portion for permitting said skirt lip to move outwardly after assemblyy into said groove means to be retained therein to prevent removal of said closure and said ring from said cover portion.

2. An improvement in fuel caps having a handgrip cover and a closure portion, said improvement comprising; a ring disposed between the cover and the closure portion and including a radially inwardly projecting lip which is outwardly flexible prior to assembly in the cover portion to permit a portion of the closure to be retained in said ring, and a flexible downwardly depending skirt means having a terminal substantially radially outwardly projecting lip means which is inwardly flexible upon assembly in the cover portion; and annular groove means in said cover portion alignable with the terminal lip means of said skirt means for permitting said terminal lip means to move outwardly after assembly into said cover portion to be retained therein to prevent removal of said closure and said ring from said cover portion.

3. An improvement in fuel caps having a handgrip cover and a closure portion, said improvement comprising; a ring disposed between the cover and the closure portion and including a radially inwardly projecting lip means for axially supporting said closure portion which lip means is outwardly flexible prior to assembly in the cover portion to permit a portion of the closure portion to be retained in said ring, and a flexible skirt portion depending downwardly from said lip means and having a terminal substantially radially outwardly projecting flat edge which is inwardly flexible during assembly into the cover portion; and annular groove means in said cover portion alignable with the terminal flat edge of said skirt portion for permitting said terminal flat edge to move outwardly after assembly into said groove means to be retained therein to prevent removal of said closure and said ring from said cover portion.

* * * * *